No. 681,497. Patented Aug. 27, 1901.
E. D. DAVIS.
ANIMAL TRAP.
(Application filed Nov. 19, 1900.)

(No Model.)

Witnesses:
R. J. Jacker
A. Gustafson

Inventor:
Elmer D. Davis
By Chas. C. Tillman
Atty.

THE NORRIS PETERS CO., PHOTO-LITHO., WASHINGTON, D. C.

UNITED STATES PATENT OFFICE.

ELNINO D. DAVIS, OF CHICAGO, ILLINOIS.

ANIMAL-TRAP.

SPECIFICATION forming part of Letters Patent No. 681,497, dated August 27, 1901.

Application filed November 19, 1900. Serial No. 36,934. (No model.)

*To all whom it may concern:*

Be it known that I, ELNINO D. DAVIS, a citizen of the United States, residing at Chicago, in the county of Cook and State of Illinois, have invented certain new and useful Improvements in Animal-Traps, of which the following is a specification.

This invention relates to improvements in traps for catching animals of various kinds, and while it is more especially intended to be used for capturing rats yet it may be employed by increasing or diminishing the dimensions of the trap and its various parts for capturing or holding larger and smaller animals or birds, fowls, and other creatures; and it consists in certain peculiarities of the construction, novel arrangement, and operation of the various parts thereof, as will be hereinafter more fully set forth and specifically claimed.

The principal object of my invention is to provide an animal-trap which shall be reset by the captured animal after it is safely encaged, so that other animals may have free access to the interior of the trap and also be insnared.

Another object of the invention is to furnish a trap of the above-described character which shall be simple and inexpensive in construction, strong, durable, and in which the operative parts will all be inclosed in the casing, so as to prevent any external interference with the operation thereof.

Other objects and advantages of the invention will be disclosed in the subjoined description and explanation.

In order to enable others skilled in the art to which my invention pertains to make and use the same, I will now proceed to describe it, referring to the accompanying drawings, in which—

Figure 1:
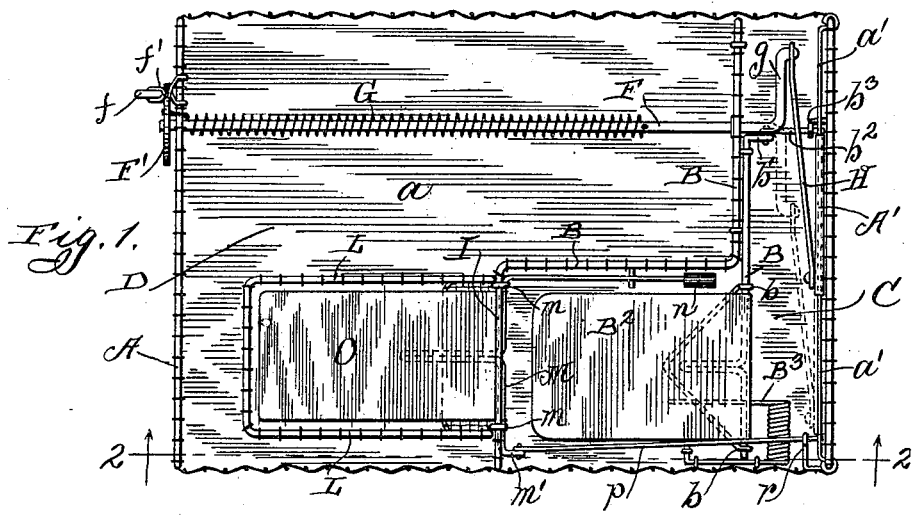
Figure 2:
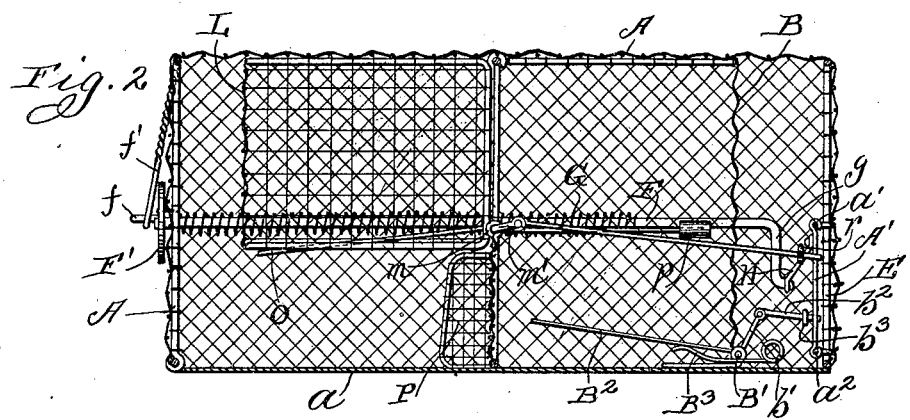
Figure 3:
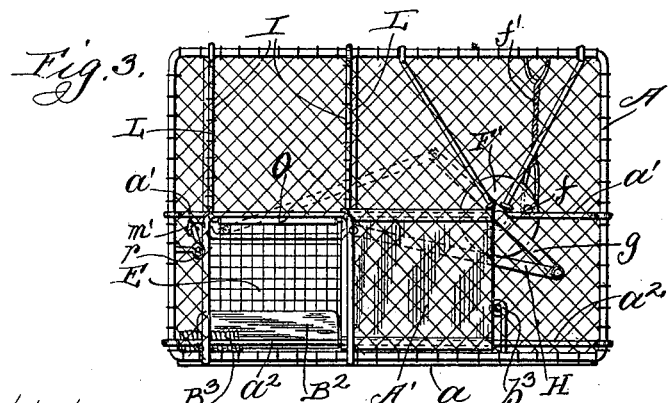

Figure 1 is a view of a trap embodying my invention, showing the upper portion of the cage or casing removed, so as to disclose the operating mechanism. Fig. 2 is a longitudinal sectional view taken on line 2 2 of Fig. 1; and Fig. 3 is a view in end elevation of the front or entrance portion of the trap, showing the door thereof open.

Similar letters refer to like parts throughout the different views of the drawings.

A represents a box or cage, which may be made of any suitable size, form, and material, but which in the present instance I have shown as being made of wire-netting and rectangular in shape and as having an imperforate bottom $a$ of metal or other material. This box or casing is formed by means of a partition B, extending from one side thereof to the other and from its top to bottom, into two compartments C and D, the former of which I shall designate the "entrance-chamber" and the latter the "cage." The front end of the casing or box A is formed with a doorway E for the entrance of the animal. Located above and below said doorway in a horizontal position and on the interior of the casing are rods $a'$ and $a^2$, on which is movably mounted a door $A'$, employed for closing the opening or the doorway E. These rods form a convenient guideway for said door; but I may employ other means for movably supporting it. Within the casing A and on the floor thereof directly in front of the opening E is mounted on a rod or bar $B'$ a platform $B^2$, which is normally held in a raised position by means of a spring $B^3$, usually secured to the floor of the casing. The rod $B'$, on which the platform $B^2$ is mounted, is supported in suitable bearings $b$ and extends laterally to near the opposite side casing from that nearer the said platform and has said end bent to form or is provided with a crank-arm $b'$, to which is pivotally secured a rod or bar $b^2$, which passes through an eye or guide piece $b^3$, secured to the lower portion of the interor of the front part of the casing.

Extending horizontally from the rear end of the casing to and through the partition B thereof and having its bearings in the casing and said partition is a shaft F, which has therearound a spring G, which is secured at one of its ends to said shaft and at its other end to a disk $F'$, loosely mounted thereon, which disk or wheel has a crank-handle $f$, used for turning the same and which crank may be secured in position by means of a loop $f'$ of wire or other suitable material. The inner end of the shaft F is formed with a crank $g$, to the free end of which is pivotally secured one end of a bar H, the other end of which is pivotally secured to the door $A'$, as is clearly shown in Fig. 1 of the drawings.

The partition B is formed in its upper portion and directly in front of the doorway or opening E with an opening I, and extending rearwardly from said opening is a partition L, which is open at its bottom. Journaled in suitable bearings $m$ on the threshold of the door or opening I is a rock-shaft M, one end of which is provided with a weight $n$ to counterbalance the weight of the platform O, which is fixed on said shaft and which closes the opening in the bottom of the partition L. The opposite end of the shaft M from that on which the weight is located is formed with a crank $m'$, to which is pivotally secured at one of its ends a rod $p$, which passes through an eye or guide-piece $r$, secured to the casing A near one side of the entrance-opening. Below the opening I in the partition B is usually located a bait-box P, in which may be placed suitable food or material to be used for enticing the animal to the interior of the casing.

The operation is as as follows: The spring on the shaft F is turned by means of the crank-handle $f$ on the disk F' or by any suitable means which may be employed instead of said disk and crank until a suitable tension is given to the spring G, which surrounds said shaft and actuates the same. The door A', being connected to the crank $g$ of the shaft F, will be held in its retracted position or that position shown in Fig. 3 of the drawings by reason of the engagement therewith of the rod $b^2$, which is connected to the shaft B', on which the platform B² is mounted. As the animal enters the casing through the opening E it will step on the platform B², and by reason of its weight said platform will be depressed, which operation will withdraw the rod $b^2$ from engagement with the door A' and permit the shaft F to turn until it forces the door A' into engagement with the rod $p$, connected to the rock-shaft M, on which the platform O is mounted. The animal finding itself inclosed in the entrance-chamber C will endeavor to escape therefrom and will jump or step onto the platform O, which will be depressed by the weight of the animal, which operation will withdraw the rod $p$ from engagement with the door A' and permit the rod F to continue its revolution, which action will be retarded by the rod $b^2$, connected to the shaft B', on which the platform B² is mounted. The trap is now set for the entrance of another animal and for the repetition of the above-described operation of the parts.

Having thus fully described my invention, what I claim as new, and desire to secure by Letters Patent, is—

1. In an animal-trap, the combination with a casing or box, of a partition dividing it into an entrance-chamber and cage, each having an opening for the ingress of the animal, a door movably mounted on the interior of the casing to close the opening therein, a rod horizontally journaled near the opening in the casing and having at one of its ends a crank, a platform fixed to said rod, a rod pivotally secured to said crank, to engage said door, a spring-actuated shaft journaled in the casing and provided at its inner end with a crank and a connection uniting said crank and door, substantially as described.

2. In an animal-trap, the combination with a casing or box, of a partition dividing it into an entrance-chamber and a cage, each having an opening for the ingress of the animal, a door movably mounted on the interior of the casing to close the opening therein, a rod horizontally journaled in the opening in the casing and having at one of its ends a crank, a platform fixed to said rod, a rod pivotally secured to said crank to engage the door, a spring-actuated shaft journaled in the casing, and provided at its inner end with a crank, a connection uniting said crank and door, a rock-shaft horizontally journaled near the threshold of the opening in the partition and having on one of its ends a weight and at its other end a crank, a platform fixed on said rock-shaft and adapted to close the opening in the partition, a rod pivotally connected at one of its ends to the crank on the rock-shaft and having its other end located near the opening in the casing to engage the door thereof when in its projected position, substantially as described.

ELNINO D. DAVIS.

Witnesses:
CHAS. C. TILLMAN,
A. GUSTAFSON.